(12) United States Patent
Liu et al.

(10) Patent No.: US 11,269,216 B2
(45) Date of Patent: *Mar. 8, 2022

(54) BACKLIGHT UNITS WITH SUPPORT POSTS AND CAVITY HEIGHT MONITORING

(71) Applicant: Apple Inc., Cupertino, CA (US)

(72) Inventors: Rong Liu, Sunnyvale, CA (US); Yu P. Sun, Yorba Linda, CA (US); Erik A. Zweigle, San Jose, CA (US); Jun Qi, San Jose, CA (US); Victor H. Yin, Cupertino, CA (US); Ziruo Hong, Cupertino, CA (US); Sungwon Bae, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,386

(22) Filed: Jun. 3, 2020

(65) Prior Publication Data
US 2020/0292885 A1 Sep. 17, 2020

Related U.S. Application Data

(63) Continuation of application No. 16/409,688, filed on May 10, 2019, now Pat. No. 10,739,638, which is a
(Continued)

(51) Int. Cl.
*G02F 1/133* (2006.01)
*G02F 1/13357* (2006.01)
(Continued)

(52) U.S. Cl.
CPC ......... *G02F 1/133608* (2013.01); *F21K 9/64* (2016.08); *F21K 9/68* (2016.08);
(Continued)

(58) Field of Classification Search
CPC ........ F21K 9/64; F21K 9/68; G02F 1/133605; G02F 1/133606; G02F 1/133608; G02F 1/133611; G09G 3/3648; G09G 3/3406
See application file for complete search history.

(56) References Cited

U.S. PATENT DOCUMENTS 8,720,781 B2    5/2014    Wang et al.
9,379,288 B2    6/2016    Choi et al.
(Continued)

FOREIGN PATENT DOCUMENTS

CN    102767803 A    11/2012
CN    106371245 A    2/2017
(Continued)

OTHER PUBLICATIONS

Hirsch et al. "BiDi screen." ACM Transactions on Graphics 28 (2009): 1. Web. Oct. 21, 2011. © 2011 ACM, Inc.
(Continued)

*Primary Examiner* — Liliana Cerullo
(74) *Attorney, Agent, or Firm* — Treyz Law Group, P.C.; G. Victor Treyz; David K. Cole

(57) ABSTRACT

An electronic device may have a display with a backlight. The backlight provides backlight illumination for an array of pixels that is displaying images. The backlight may include an array of cells. Each cell may contain a light source with one or more light-emitting diodes and a cavity reflector that reflects light from the light source outwardly through a diffuser for use in forming the backlight illumination. The light sources may be mounted to a printed circuit. Support posts on the printed circuit may be used to maintain the diffuser at a fixed distance from the printed circuit. Sensors on the printed circuit may be used to measure separation distances between the printed circuit and diffuser. Adjust-
(Continued)

ments to pixel gain profiles can be made based on the measured separation distances.

15 Claims, 14 Drawing Sheets

Related U.S. Application Data continuation of application No. PCT/US2018/022935, filed on Mar. 16, 2018, which is a continuation of application No. 15/687,374, filed on Aug. 25, 2017, now abandoned.

(60) Provisional application No. 62/501,002, filed on May 3, 2017.

(51) Int. Cl.
*F21K 9/64* (2016.01)
*F21K 9/68* (2016.01)
*G09G 3/34* (2006.01)
*G09G 3/36* (2006.01)

(52) U.S. Cl.
CPC .. *G02F 1/133603* (2013.01); *G02F 1/133605* (2013.01); *G02F 1/133606* (2013.01); *G02F 1/133611* (2013.01); *G09G 3/3406* (2013.01); *G09G 3/3648* (2013.01)

(56) References Cited

U.S. PATENT DOCUMENTS

| | | | |
|---|---|---|---|
| 9,530,344 | B2 | 12/2016 | Gandhi et al. |
| 10,739,638 | B2* | 8/2020 | Liu .................... G02F 1/133606 |
| 2004/0156185 | A1* | 8/2004 | Wu .................... G02F 1/133606 |
| | | | 362/632 |
| 2005/0281050 | A1 | 12/2005 | Chou |
| 2007/0047228 | A1 | 3/2007 | Thompson et al. |
| 2007/0236628 | A1 | 10/2007 | Epstein |
| 2011/0304798 | A1 | 12/2011 | Tanaka et al. |
| 2012/0063133 | A1 | 3/2012 | Takeuchi et al. |
| 2012/0120325 | A1* | 5/2012 | Shimizu ............ G02F 1/133608 |
| | | | 348/790 |
| 2012/0212690 | A1 | 8/2012 | Sasaki et al. |
| 2013/0128128 | A1 | 5/2013 | Ikuta |
| 2013/0250619 | A1 | 9/2013 | Kim et al. |
| 2014/0009837 | A1* | 1/2014 | Liu .................... G09F 13/0409 |
| | | | 359/599 |
| 2014/0327360 | A1 | 11/2014 | Hoshino et al. |
| 2015/0346551 | A1 | 12/2015 | Sun et al. |
| 2016/0005219 | A1 | 1/2016 | Powell et al. |
| 2017/0009960 | A1* | 1/2017 | Ahn .................. G02F 1/133603 |
| 2017/0010506 | A1 | 1/2017 | Huang et al. |
| 2018/0107068 | A1* | 4/2018 | Sasaki .............. G02F 1/133606 |
| 2019/0258115 | A1* | 8/2019 | Kyoukane ......... G02F 1/133603 |

FOREIGN PATENT DOCUMENTS

| | | |
|---|---|---|
| EP | 3121645 A1 | 1/2017 |
| JP | 2007157451 A | 6/2007 |
| JP | 2009-150981 A | 7/2009 |
| JP | 2010009950 A | 1/2010 |
| JP | 2010272245 A | 12/2010 |
| JP | 3170916 U | 10/2011 |
| JP | 2012004067 A | 1/2012 |
| JP | 2013246988 A | 12/2013 |
| JP | 2014220035 A | 11/2014 |
| KR | 10-2005-0116641 A | 12/2005 |
| KR | 10-2013-0070772 A | 6/2013 |
| KR | 10-2015-0065318 A | 6/2015 |
| KR | 10-2008-0093220 A | 10/2018 |
| TW | 200842448 A | 11/2008 |
| TW | 201405213 A | 11/2008 |
| TW | 201013263 A | 4/2010 |
| TW | 201116764 A | 5/2011 |
| TW | I393959 B | 4/2013 |
| TW | I526740 B | 3/2016 |
| TW | I538603 B | 6/2016 |
| WO | 2017038082 A1 | 3/2017 |

OTHER PUBLICATIONS

Kalantar et al., Functional Light-Guide Plate Characterized by Optical Micro-Deflector and Micro-Reflector for LCD Backlight, Special Issue on Electronic Displays, Nov. 2001, vol. E84-C, No. 11, IEICE Trans. Electron, Japan.

* cited by examiner

BACKLIGHT UNITS WITH SUPPORT POSTS AND CAVITY HEIGHT MONITORING

This application is a continuation of U.S. patent application Ser. No. 16/409,688, filed May 10, 2019, which is a continuation of International Application PCT/US2018/022935, with an international filing date of Mar. 16, 2018, which claims priority to U.S. patent application Ser. No. 15/687,374, filed on Aug. 25, 2017, which claims the benefit of provisional patent application No. 62/501,002, filed on May 3, 2017, which are hereby incorporated by reference herein in their entireties.

BACKGROUND

This relates generally to displays, and, more particularly, to backlit displays.

Electronic devices often include displays. For example, computers and cellular telephones are sometimes provided with backlit liquid crystal displays. Edge-lit backlight units have light-emitting diodes that emit light into an edge surface of a light guide plate. The light guide plate then distributes the emitted light laterally across the display to serve as backlight illumination. Direct-lit backlight units have arrays of light-emitting diodes that emit light vertically through the display.

Direct-lit backlights may have locally dimmable light-emitting diodes that allow dynamic range to be enhanced. If care is not taken, however, the light produced by a direct-lit backlight may not be sufficiently uniform. For example, variations in the distance between the light-emitting diodes and an overlapping diffuser layer may lead to undesired uniformity variations m a backlight.

SUMMARY

An electronic device may have a display with a backlight. The backlight provides backlight illumination for an array of pixels that is displaying images. The backlight may include an array of backlight cells. Each cell may contain a light source with one or more light-emitting diodes and a cavity reflector that reflects light from the light source outwardly through a diffuser for use in forming the backlight illumination.

The light sources may be mounted to a printed circuit. Support posts may be used to maintain the diffuser at a fixed distance from the printed circuit. The support posts may be formed as integral protrusions of the diffuser, may be separate polymer structures formed from polymers such as clear and white polymers, and may be coupled to the printed circuit and diffuser using adhesive, screws, or other attachment mechanisms.

Optical sensors may be provided on the printed circuit. The optical sensors may each include a light-emitting device such as a light-emitting diode and a light detector. The optical sensors can measure light from the light-emitting diode that has reflected from the diffuser through respective openings in the cavity reflectors. Separation between the diffuser and the printed circuit can be measured with the optical sensors and used by control circuitry to update pixel gain profiles that correct images for variations in backlight intensity across the display.

DETAILED DESCRIPTION

Electronic devices may be provided with backlit displays. The backlit displays may include liquid crystal pixel arrays or other display structures that are backlit by light from a direct-lit backlight unit. A perspective view of an illustrative electronic device of the type that may be provided with a display having a direct-lit backlight unit is shown in FIG. 1.

Figure 1:
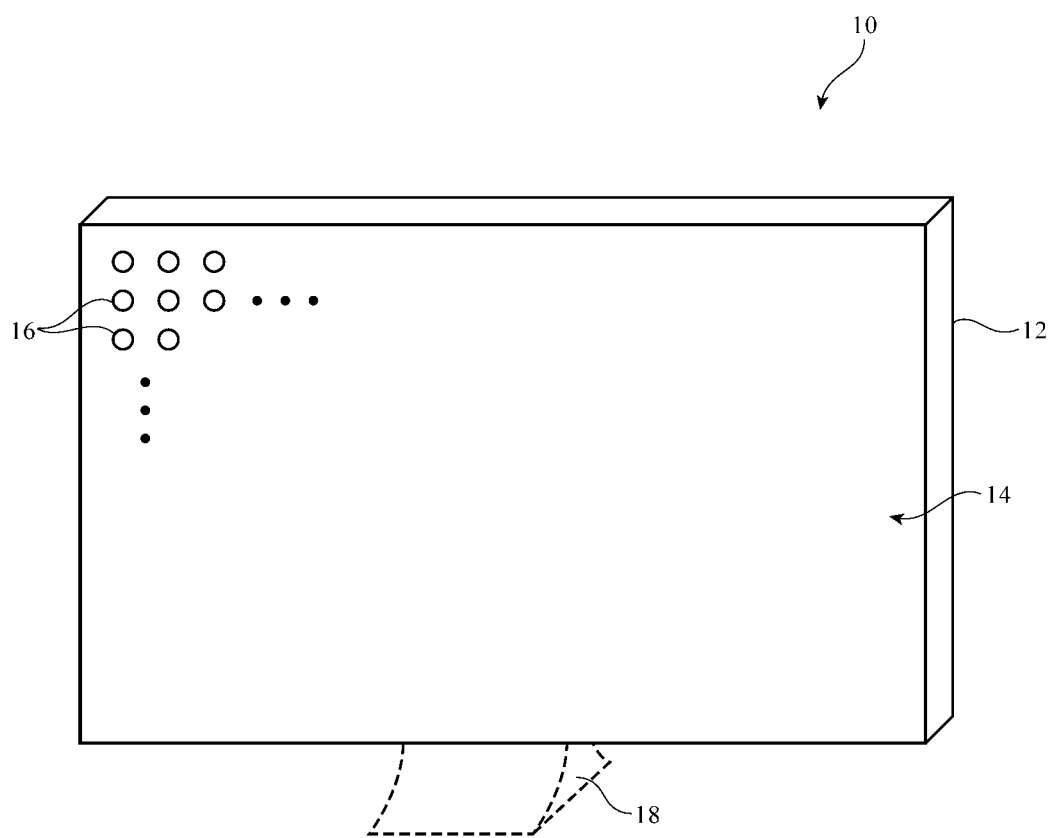
FIG. 1 is a diagram of an illustrative electronic device having a display in accordance with an embodiment.

Electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, device 10 may have a display such as display 14. Display 14 may be mounted m housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Housing 12 may have a stand such as optional stand 18, may have multiple parts (e.g., housing portions that move relative to each other to form a laptop computer or other device with movable parts), may have the shape of a cellular telephone or tablet computer (e.g., in arrangements in which stand 18 is omitted), and/or may have other suitable configurations. The arrangement for housing 12 that is shown in FIG. 1 is illustrative.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels 16 formed from liquid crystal display (LCD) components or may have an array of pixels based on other display technologies. A cross-sectional side view of display 14 is shown in FIG. 2.

Figure 2:
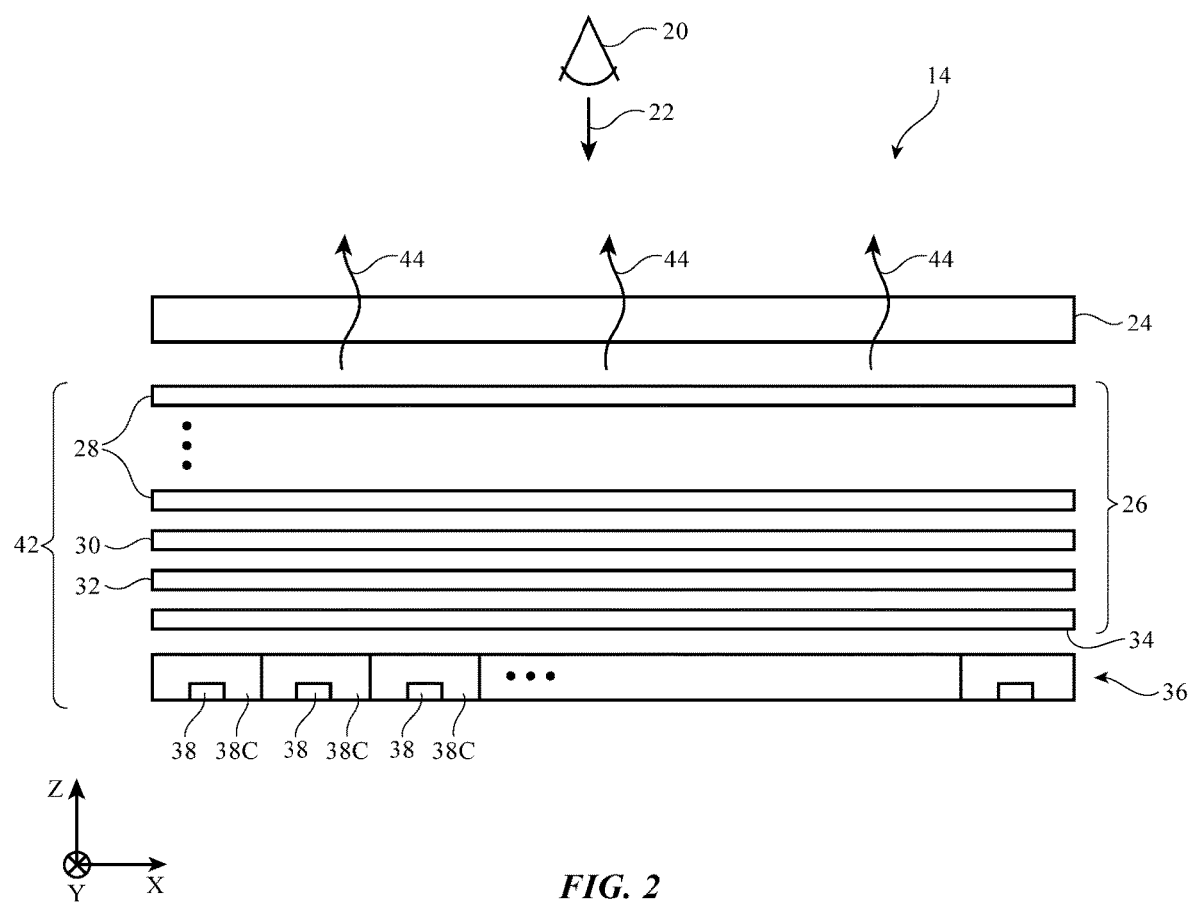
FIG. 2 is a cross-sectional side view of an illustrative display in accordance with an embodiment.

As shown in FIG. 2, display 14 may include a pixel array such as pixel array 24. Pixel array 24 may include an array of pixels such as pixels 16 of FIG. 1 (e.g., an array of pixels having rows and columns of pixels 26). Pixel array 24 may be formed from a liquid crystal display module (sometimes referred to as a liquid crystal display or liquid crystal layers) or other suitable pixel array structures. A liquid crystal display for forming pixel array 24 may, as an example, include upper and lower polarizers, a color filter layer and a thin-film transistor layer interposed between the upper and lower polarizers, and a layer of liquid crystal material interposed between the color filter layer and the thin-film transistor layer. Liquid crystal display structures of other types may be used in forming pixel array 24, if desired.

During operation of 14, images may be displayed on pixel array 24. Backlight unit 42 (which may sometimes be referred to as a backlight, backlight layers, backlight structures, a backlight module, a backlight system, etc.) may be used in producing backlight illumination 44 that passes through pixel array 24. This illuminates any images on pixel array 24 for viewing by a viewer such as viewer 20 who is viewing display 14 in direction 22.

Backlight unit 42 may have optical films 26, a light diffuser such as light diffuser (light diffuser layer) 34, and light source array 36. Light source array 36 may contain a two-dimensional array of light sources 38. Each light source 38 may contain one or more light-emitting diodes and may be associated with a respective one of backlight cells 38C. Cells 38C may contain reflectors for reflecting light through pixel array 24. Cells 38C may be arranged in an array with rows and columns in the X-Y plane of FIG. 2.

Light sources 38 in cells 38C may be controlled in unison by control circuitry in device 10 or may be individually controlled (e.g., to implement a local dimming scheme that helps improve the dynamic range of images displayed on pixel array 24). The light produced by each cell 38C may travel upwardly along dimension Z through light diffuser 34 and optical films 26 before passing through pixel array 24. Light diffuser 34 may contain light-scattering structures that diffuse the light from light-emitting diode array 36 and thereby help provide uniform backlight illumination 44. Optical films 26 may, as an example, include films such as dichroic filter 32, phosphor layer 30, and films 28. Films 28 may include brightness enhancement films that help to collimate light 44 and thereby enhance the brightness of display 14 for user 20 and/or other optical films (e.g., compensation films, etc.).

The light-emitting diodes of light sources 38 may emit light of any suitable color. With one illustrative configuration, the light-emitting diodes emit blue light. Dichroic filter layer 32 may be configured to pass blue light from light-emitting diodes 38 while reflecting light at other colors. Blue light from light-emitting diodes 38 may be converted into white light by a photoluminescent material such as phosphor layer 30 (e.g., a layer of white phosphor material or other photoluminescent material that converts blue light into white light). If desired, other photoluminescent materials may be used to convert blue light to light of different colors (e.g., red light, green light, white light, etc.). For example, layer 30 (which may sometimes be referred to as a photoluminescent layer or color conversion layer) may include quantum dots that convert blue light into red and green light (e.g., to produce white backlight illumination that includes, red, green, and blue components, etc.). Configurations in which light-emitting diodes 38 emit white light (e.g., so that layer 30 may be omitted, if desired) and/or in which light-emitting diodes 38 emit blue or ultraviolet pump light for pixels containing quantum dots may also be used.

In configurations in which layer 30 emits white light such as white light produced by phosphorescent material in layer 30, white light that is emitted from layer 30 in the downwards (−Z) direction may be reflected back up through pixel array 24 as backlight illumination by dichroic filter layer 32 (i.e., layer 32 may help reflect backlight outwardly away from array 36). In configurations in which layer 30 includes, for example, red and green quantum dots, dichroic filter 32 may be configured to reflect red and green light from the red and green quantum dots, respectively to help reflect backlight outwardly away from array 36. By placing the photoluminescent material of backlight 42 (e.g., the material of layer 30) above diffuser layer 34, light-emitting diodes 38 may be configured to emit more light towards the edges of the light-emitting diode cells (tiles) of array 36 than at the centers of these cells, thereby helping enhance backlight illumination uniformity.

Figure 3:
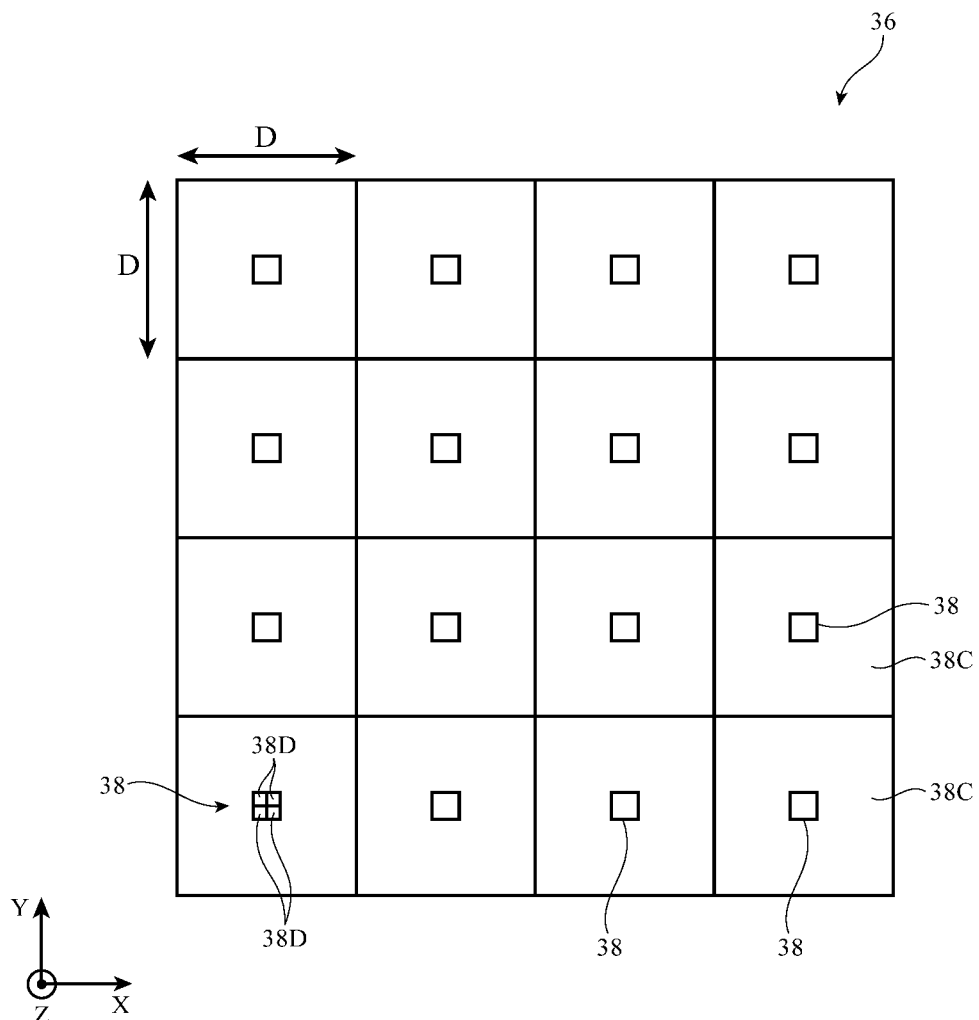
FIG. 3 is a top view of an illustrative backlight cell array having rows and columns of light source cells for a direct-lit backlight unit in accordance with an embodiment.

FIG. 3 is a top view of an illustrative light source array for backlight 42. As shown in FIG. 3, array 36 may contain row and columns of light-sources 38. Each light source 38 may be associated with a respective cell 38C. The length D of the edges of cells 38C may be 2 mm, 18 mm, 1-10 mm, 1-4 mm, 10-30 mm, more than 5 mm, more than 10 mm, more than 15 mm, more than 20 mm, less than 25 mm, less than 20 mm, less than 15 mm, less than 10 mm, or other suitable size. If desired, hexagonally tiled arrays and arrays with light sources 38 that are organized in other suitable array patterns may be used. In arrays with rectangular cells, each cell may have sides of equal length (e.g., each cell may have a square outline in which four equal-length cell edges surround a respective light-emitting diode) or each cell may have sides of different lengths (e.g., a non-square rectangular shape). The configuration of FIG. 3 in which array 36 has rows and columns of square light-emitting regions such as cells 38C is merely illustrative.

If desired, each cell 38C may have a light source that is formed from an array of light-emitting diode dies (e.g., multiple individual light-emitting diodes 38D arranged in an array such as a 2×2 cluster of light-emitting diodes forming a four-die light source 38 at the center of each cell 38C). This type of configuration is illustrated by light source 38 in the leftmost and lowermost cell 38C of FIG. 3, which has been formed from a 2×2 array of light-emitting diodes 38D (e.g., four separate light-emitting diode dies). The diodes 38D in light source 38 in the lower left corner of array 36 of FIG. 3 may be mounted on a common package substrate, may be mounted on a printed circuit board substrate that extends across array 36, or may be mounted in array 36 using other suitable arrangements. In general, each cell 38C may include a light source 38 with a single light-emitting diode 38D, a pair of light-emitting diodes 38D, 2-10 light-emitting diodes 38D, at least two light-emitting diodes 38D, at least 4 light-emitting diodes 38D, at least eight light-emitting diodes 38D, fewer than five light-emitting diodes 38D, or other suitable number of light-emitting diodes.

Figure 4:
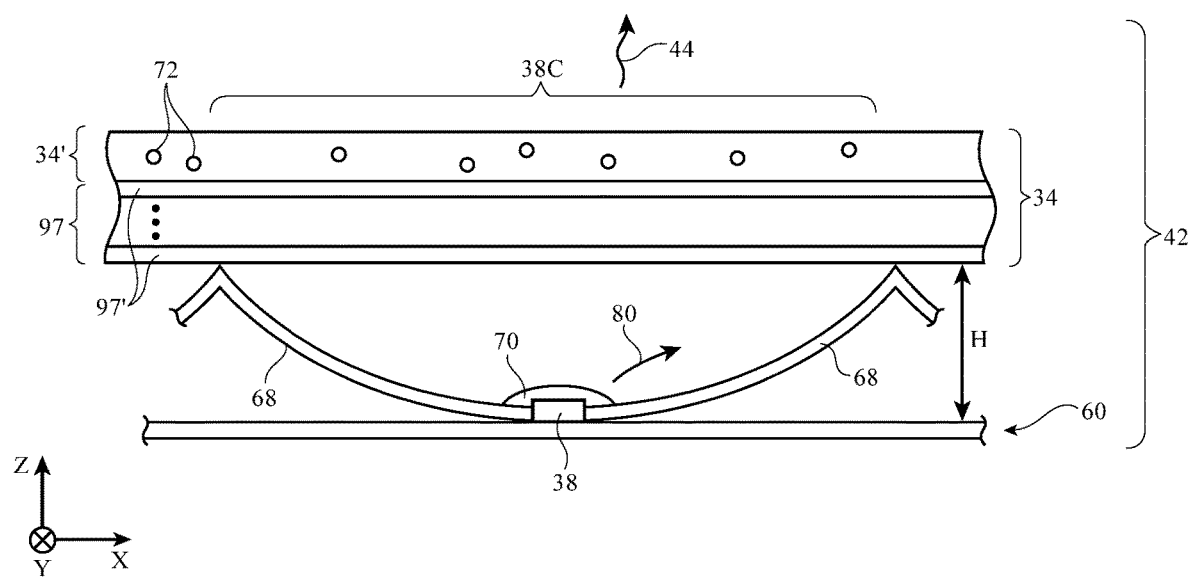
FIG. 4 is a cross-sectional side view of an illustrative light source such as a light-emitting diode in a cavity reflector of a backlight cell m accordance with an embodiment.

FIG. 4 is a cross-sectional side view of an illustrative backlight cell 38C in backlight 42. As shown in FIG. 4, each cell 38C in array 36 may have a reflector such as cavity reflector 68. Reflector 68 may have a square outline (i.e., a square footprint when viewed from above) or may have other suitable shapes and may be formed from sheet metal (e.g., stamped sheet metal), metallized polymer film, a thin-film metal on a plastic carrier, a dielectric thin-film stack that forms a dielectric mirror (a thin-film interference mirror) on a polymer film or molded plastic carrier, a white reflective film (e.g., a glossy white polymer sheet formed from a white ink layer or other white layer on a polymer carrier covered with a glossy coating such as a glossy polymer coating), or other suitable reflector structure.

An opening may be formed in reflector 68 in each cell 38C to accommodate a respective light source 38. The light source 38 in each cell may have an upper portion that protrudes through the opening in reflector 68 and a lower portion with contacts that are soldered or otherwise mounted to metal traces in printed circuit 60.

The reflectors in cells 38C may have cross-sectional profiles with curved portions to help reflect light from light sources 38 upwards as backlight illumination 44. With one illustrative configuration, a polymer film (e.g., a film coated with a dielectric thin-film interference mirror surface or a glossy white reflective surface) may be embossed using a roller (e.g., the film may be thermoformed using patterned structures on a heated roller). Following thermoforming operations to form the curved walls of reflector 68 in each cell 38C, a die cutting tool or other cutting apparatus may cut openings for each of light sources 38.

As shown in FIG. 4, a transparent structure such as transparent dome structure 70 may be formed over each light source 38 to help laterally distribute light 80 that has been emitted by that light source. Dome structure 70 may be formed from a bead of clear silicone or other transparent polymer (as an example). During operation, light source 38 emits light 80 that is refracted away from the Z axis by dome structure 70.

Some rays of light 80 are oriented at relatively large angles with respect to the Z axis of FIG. 4. These off-axis rays of light 80 are reflected upwardly in direction Z from reflector 68. Other rays of light 80 are oriented at smaller angles with respect to the Z axis (surface normal of display 14). If desired, backlight 42 may include an optional filter layer with an angularly dependent light transmission characteristic such as filter layer 97. Diffuser layer 34 may include light-diffusing layer 34'. Layer 34' may include light-scattering particles such as particles 72 in a polymer binder and/or may have other light-scattering structures for diffusing light 80 from light sources 38. Filter layer 97 may be a thin-film interference filter formed from multiple dielectric layers 97' or other suitable filter with an angularly dependent light transmission characteristic. Filter layer 97 may be formed on a substrate that is separate from layer 34' or may be formed on layer 34' in diffuser 34 as shown in the illustrative configuration of FIG. 4.

The layers of display 14 may not be perfectly flat due to external pressure, due to expansion and/or contraction caused by thermal fluctuations, and/or due to manufacturing variations. This may create undesired fluctuations in the separation distance H (sometimes referred to as optical distance H) between printed circuit 60 and diffuser 34. With one illustrative configuration, display 14 may include an array of supporting posts in backlight 42 that help maintain a desired fixed value for height H across display 14.

Figure 5:
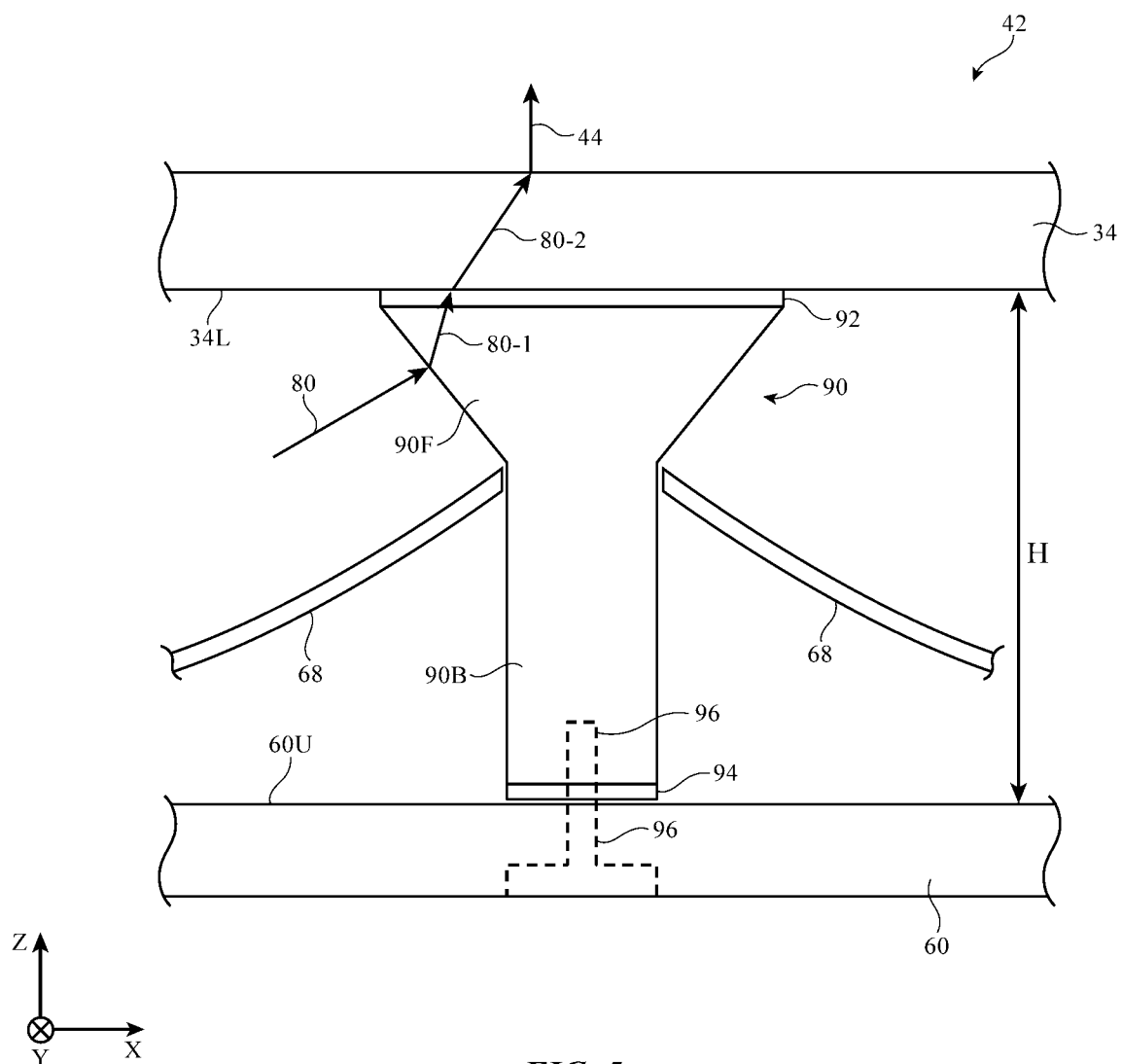
FIG. 5 is a cross-sectional side view of an illustrative transparent support post for a backlight in accordance with an embodiment.

FIG. 5 is a cross-sectional side view of an illustrative portion of backlight 42 showing how backlight 42 may include a support post. As shown in FIG. 5, support post 90 may extend between the upper surface 60U of printed circuit 60 and the opposing lower surface (surface 34L) of diffuser 34 (as an example). Posts 90 may be cylindrical (radially symmetric) or may have other shapes (e.g., shapes in which one or more sides of posts 90 have flat portions). Radially symmetric arrangements for posts 90 may help to reduce shadows.

The presence of support posts such as support post 90 of FIG. 5 may help maintain a fixed separation height H between diffuser 34 and printed circuit 60 and may therefore help to stabilize the vertical separation between light sources 38 in array 36 and diffuser 34. This stabilization will help reduce fluctuations in light intensity that might otherwise result in hotpots and dark zones in areas of display 14.

As shown in FIG. 5, support post 90 may have a lower portion such as lower portion 90B and an upper portion such as upper portion 90F. Portion 90B may have straight sides (e.g., portion 90B may be a cylinder) and portion 90F may be tapered outwardly (e.g., portion 90F may have an inverted cone shape). Reflector 68 may have an array of openings with each opening receiving a respective support post 90. There may be a support post at each corner of each cell 38C or support posts 90 may be more sparsely arrayed in backlight 42 (e.g., to accommodate separation height measurement sensors, etc.).

Support post 90 of FIG. 5 may be attached to layer 60 using adhesive 94 and/or using a screw such as screw 96. Screw 96 may have a shaft that passes through an opening in printed circuit substrate 60 and engages threads in a threaded opening in portion 90B of post 90. Upper portion 90F of post 90 may be attached to diffuser 34 using adhesive 92. To prevent dark spots from forming on backlight 42 due to the presence of posts 90, post 90 may be formed from a transparent material such a clear polymer. Adhesive 92 may also be formed from a clear material (e.g., a clear polymer). During operation, light 80 from light source 38 may strike portion 90F of post 90 and may be redirected within post 90 as illustrated by light ray 80-1 (e.g., by refraction). Refraction at the interface between post 90) and diffuser 34 may cause light ray 80-2 to be angled at a non-zero angle with respect to light ray 80-1 and refraction at the interface between diffuser 34 and air (or other materials) above diffuser 34 may cause light ray 44 (e g, the backlight illumination exiting diffuser 34) to be angled at a non-zero angle with respect to light ray 80-2. Light 80-2 may also be scattered by scattering features in diffuser 34. The flared shape of portion 90F and the transparency of portion 90F may help guide off-axis light rays such as illustrative ray 80 over post 90, so that illumination 44 is present over post 90. As a result, local dark spots in backlight illumination 44 due to the presence of posts 90 may be reduced or eliminated.

Figure 6:
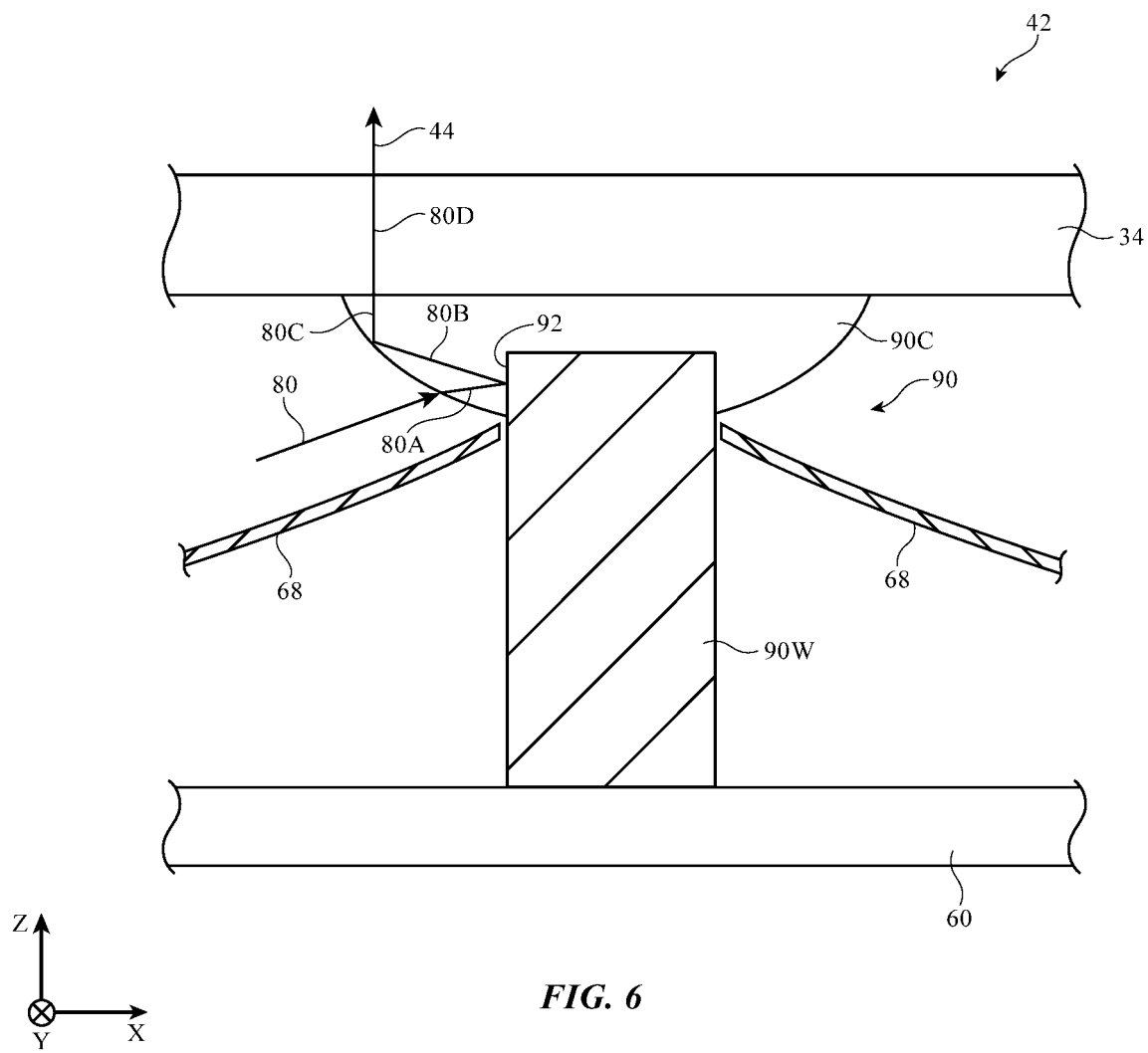
FIG. 6 is a cross-sectional side view of an illustrative support post having a white shot of plastic that is at least partly covered by a clear shot of plastic in accordance with an embodiment.

Other configurations for supporting diffuser 34 in backlight 42 may be used, if desired. In the illustrative configuration of FIG. 6, post 90 includes multiple shots of plastic. A first shot of plastic such as a white polymer is used in forming lower post portion 90W. A second shot of plastic, which is formed at least partly on top of portion 90W is used in forming upper post portion 90C. Portion 90C may be transparent (e.g., portion 90C may be formed from clear polymer). With this type of configuration, a light ray such as illustrative off-axis light ray 80 may enter clear portion 90C and refract to form light ray 80A. Light ray 80A may reflect off of reflective white surface 92 of portion 90W to form reflected ray 80B. Ray 80B may reflect from the inner surface of portion 90C (e.g., the interface between portion 90C and surrounding air in the space between diffuser 34 and printed circuit 60) in accordance with the principal of total internal reflection, thereby forming reflected ray 80C. Ray 80C may enter diffuser 34 and, following passage through diffuser 34 and possible scattering by diffuser 34, can exit diffuser 34 as backlight illumination 44. Different rays may take different paths through post 90 and layer 34. Nevertheless, as the illustrative path of ray 80 of FIG. 6 demonstrates, the presence of white portion 90W of post 90 may help to reflect light so that light is not absorbed and lost at post 90) and the presence of clear portion 90C may help redirect light above post 90 to serve as illumination 44. As a result, post structures of the type shown in FIG. 6 may help reduce dark spots that might otherwise arise from incorporating supports into backlight 42.

Figure 7:
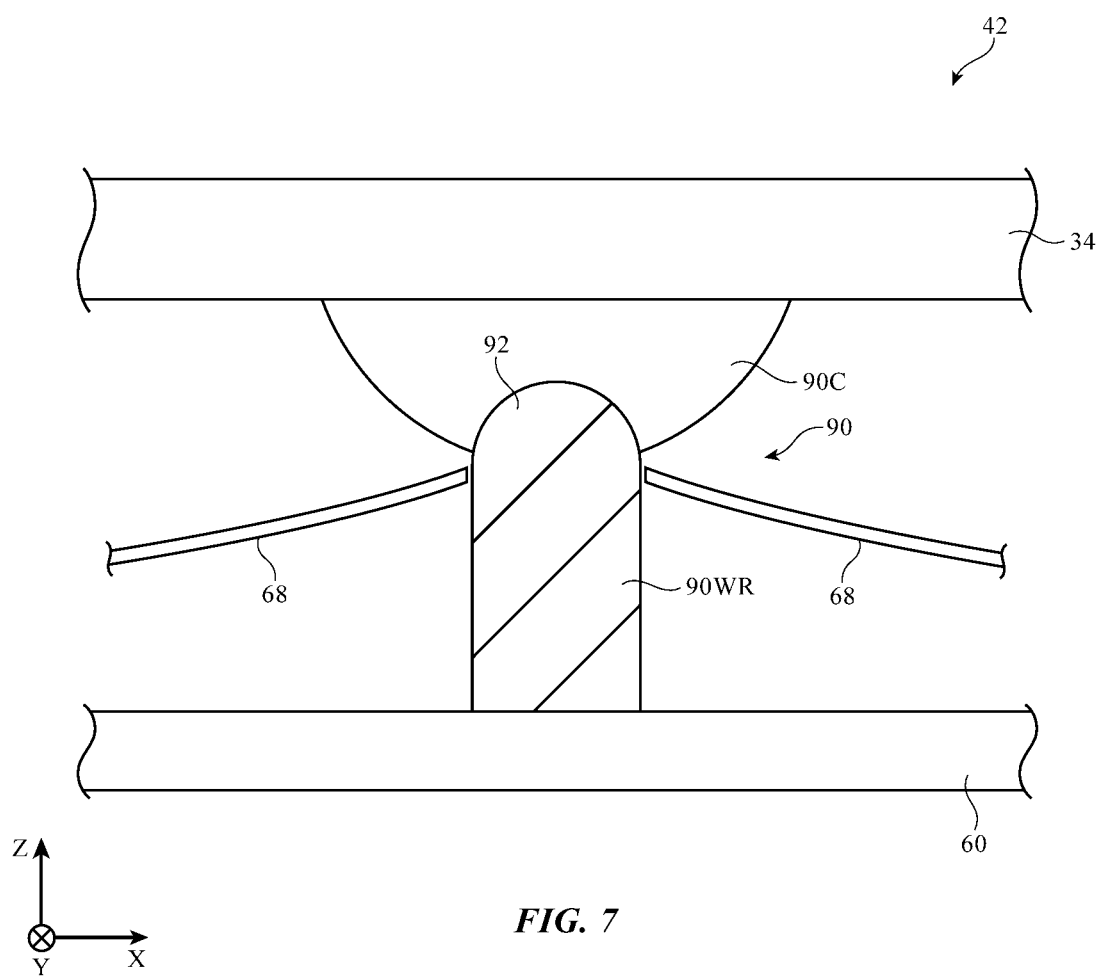
FIG. 7 is a cross-sectional side view of a portion of an illustrative support post having a white shot of plastic with a rounded tip that is at least partly covered by a clear shot of plastic in accordance with an embodiment.

In the illustrative configuration of FIG. 7, post 90 includes portion 90WR (e.g., a white polymer portion) and portion 90C (e.g., a clear polymer portion). Surface 92 of post portion 90WR is rounded. This shape may help redirect light upwards through diffuser 34 (e.g., less light may be reflected laterally and more light may be reflected upwards). Portion 90C can be flared (tapered) outwardly (e.g., so that the top of portion 90C adjacent to diffuser 34 is wider than the bottom of portion 90C adjacent to post portion 90WR) so as to facilitate the redirection of light that passes through portion 90C upwards through diffuser 34. Other shapes may be used for post portions 90WR and 90C if desired. The configuration of FIG. 7 is merely illustrative.

Figure 8:
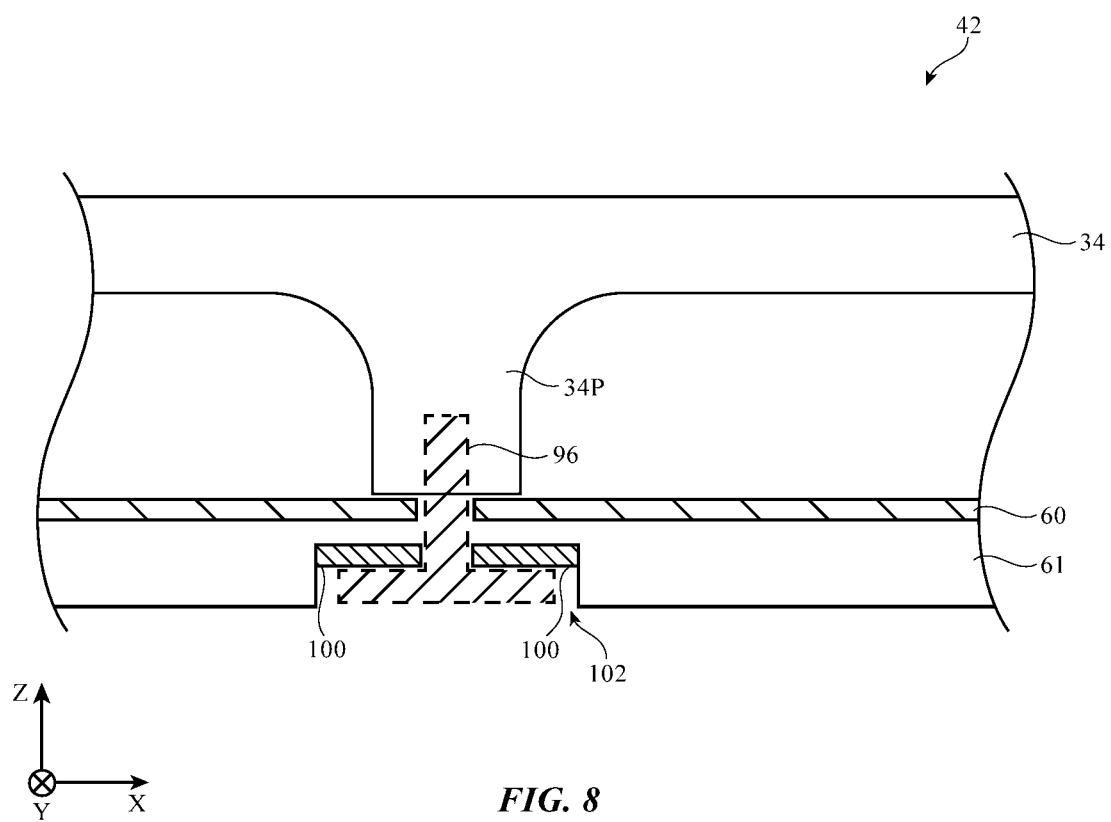
FIG. 8 is a cross-sectional side view of a portion of an illustrative diffuser layer with a support post of the type that may be formed form an integral portion of the diffuser layer in accordance with an embodiment.

As shown in FIG. 8, support posts for backlight 42 may be formed from integral portions of diffuser 34. In the example of FIG. 8, portion 34P of diffuser 34 is serving as a support post and extends between the lower surface of diffuser 34 and the opposing upper surface of printed circuit 60. Portion 34P may be formed from the same material(s) as diffuser 34 and may, for example, be formed by molding a diffuser 34 with integral support posts 34P so that these integral support posts are protrusions from the planar portion of diffuser 34. Configurations in which posts such as post 34P of FIG. 8 are formed separately from diffuser 34 and attached to diffuser 34 (e.g., using adhesive or other attachment mechanisms) may also be used. Support post 34P may be formed from clear or translucent plastic (e.g., transparent polymer, transparent polymer with light-scattering particles or other light-scattering features, etc.). The lower portion of support post 34P may be cylindrical and the upper portion of support post 34P may have a curved outwardly flared profile. Other shapes may be used for integral support posts such as support post 34P, if desired.

Support post 34P may be attached to printed circuit 60 using adhesive, a screw, or other attachment mechanisms. Printed circuit 60 may overlap a metal backlight chassis layer such as metal chassis 61 or other suitable support structure. This type of arrangement may be used in backlight 42 whenever it is desired to provide additional support for the layers of backlight 42.

In the example of FIG. 8, support post 34P is configured to receive a screw such as screw 96 (e.g., support post 34P may have a threaded opening that receives a threaded shaft portion of screw 96). Elastomeric gasket 100 (e.g., a ring-shaped washer) may be received in opening 102 of metal chassis 61. The shaft of screw 96 may pass through an opening in gasket 100 and an opening in layer 60 (e.g., an opening that is wider than the shaft of screw 96). The presence of gasket 100 between a head portion of screw 96 and metal chassis 61 may help accommodate lateral mismatch between the locations of posts 34P and the locations of openings 102 in printed circuit 60 (e.g., to satisfy alignment tolerances, to accommodate lateral shifts due to thermal expansion and contraction, etc.).

Figure 9:
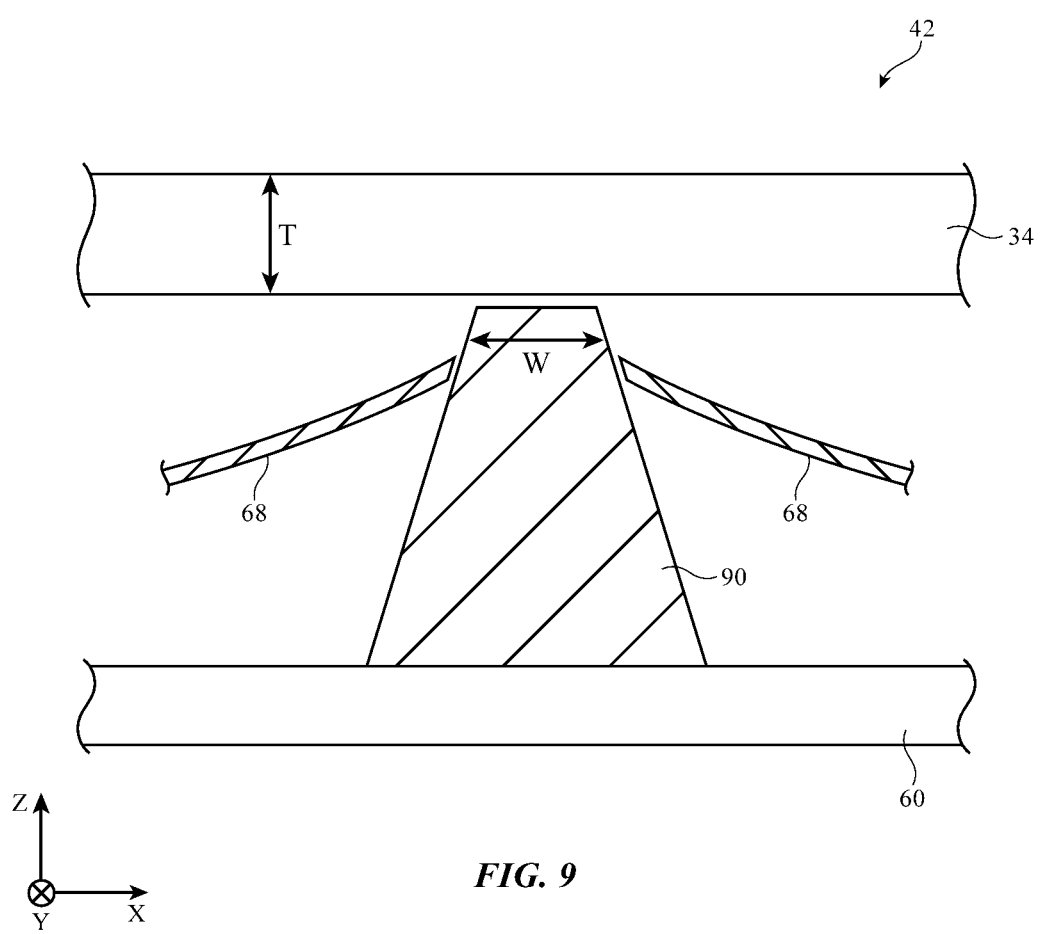
FIG. 9 is a cross-sectional side view of an illustrative support post for a backlight having an inverted cone shape in accordance with an embodiment.

As shown in FIG. 9, support post 90 (e.g., a clear polymer support post, a white polymer support post, etc.) may have an inverted cone shape or other configuration that minimizes the size (diameter W) of the upper portion of post 90 where post 90 contacts diffuser 34. In configurations in which the ratio of diffuser thickness T to post top diameter W is sufficient (e.g., at least 1, at least 2, at least 3, less than 100, etc.), shadowing of light from light sources 38 will be minimized and the presence of posts 90 will not significantly disrupt the uniformity of emitted backlight illumination 44.

Figure 10:
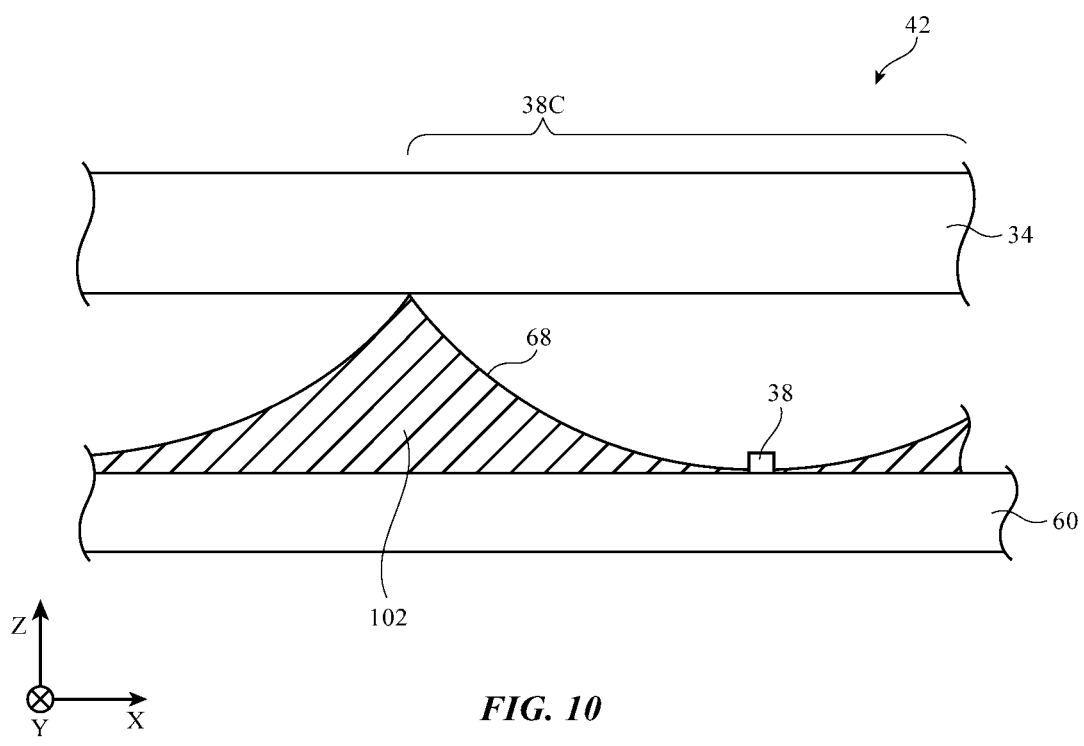
FIG. 10 is a cross-sectional side view of an illustrative cavity reflector formed over a solid supporting structure that can serve as supporting structures for a diffuser layer in accordance with an embodiment.

If desired, a molded support structure such as support structure 103 of FIG. 10 may be used in supporting cavity reflector 68. Support structure 103 may, for example, have a curved profile in each cell 38C that allows reflector 68 to reflect light upwards to form backlight illumination 44. Support structure 103 may have openings to accommodate light sources 38. Reflector 68 may be laminated to the surface of support structure 103, may be deposited on the surface of support structure 103, or may be integrated into support structure 103 (e.g., by forming support structures 103 from a reflective material such as white plastic). Molded support structures 103 of FIG. 10 may be sufficiently robust to support diffuser 34 and can therefore be used to reduce or eliminate the use of support posts 90 in backlight 42.

Figure 11:
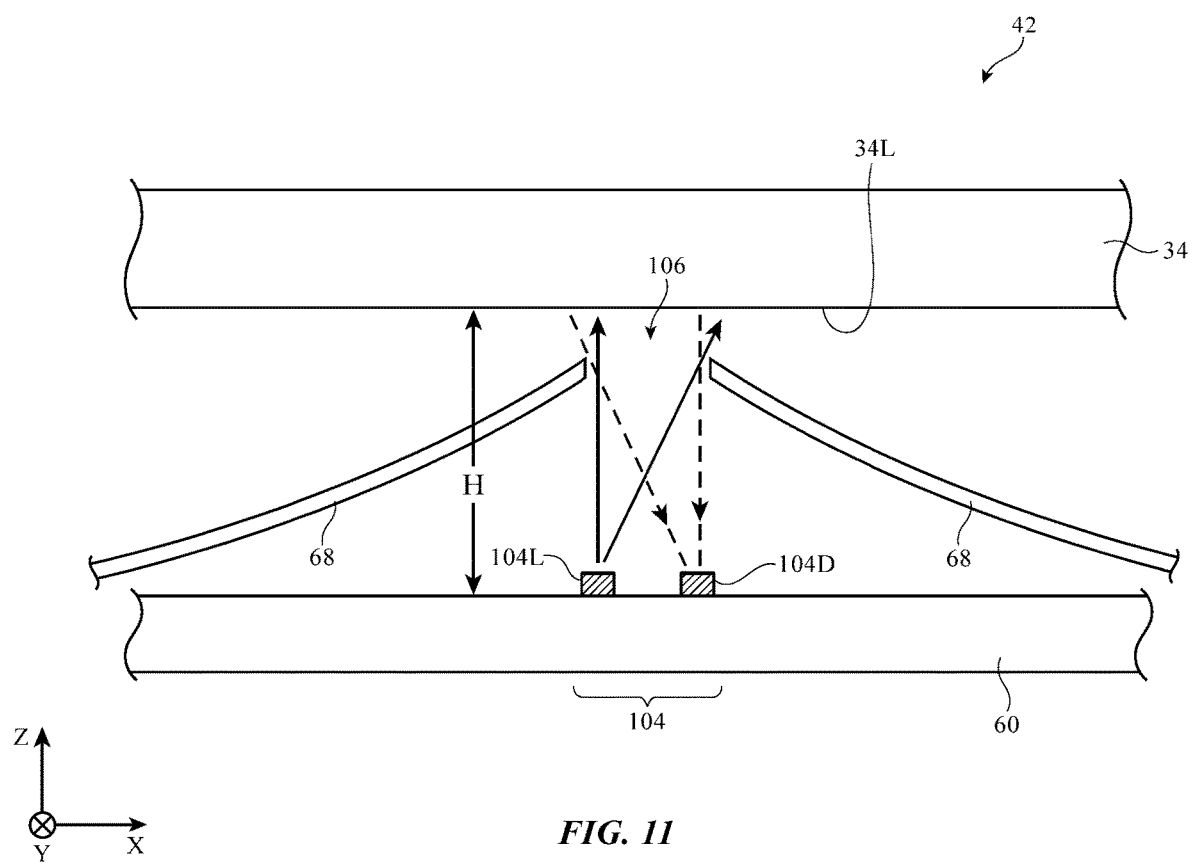
FIG. 11 is a cross-sectional side view of an illustrative diffuser layer height sensor in a backlight in accordance with an embodiment.

In some configurations, diffuser height (separation) sensors can be incorporated into backlight 42. This type of arrangement is shown in the cross-sectional side view of backlight 42 of FIG. 11. As shown in FIG. 11, reflector 68 may have openings such as opening 106 between respective cells 38C. Each opening 106 may allow light to be reflected off of lower surface 34L of diffuser 34. During operation of device 10, when the value of the height H between lower diffuser surface 34L and the corresponding upper surface of printed circuit 60 varies (e.g., due to external pressure, thermal effects, layer warping, etc.) the value of height H can be dynamically measured and used in supplying corrective calibration information (e.g., pixel gain adjustments) to display driver circuitry in device 10. The calibration information allows any brightness variations that result from variations in H to be dynamically removed, thereby ensuring that images on the array of pixels 16 of display 14 do not exhibit undesired hotspots and dark regions.

The value of height (distance) H can be measured using any suitable sensors (e.g., capacitive sensors, electromechanical displacement sensors, acoustic sensor, force sensors, etc.). With one suitable configuration, which is illustrated in FIG. 11, an array of optical sensors is used to monitor the shape of diffuser 34. As shown in FIG. 11, for example, optical sensor 104 may be aligned with opening 106 in reflector 68. Optical sensor 104 may include a light source such as light source 104L and may include a detector such as detector 104D. Light source 104L may be, for example, a light-emitting diode or a laser. Light source 104L may emit light such as infrared light that is not visible to a user and therefore does not affect images being displayed on the pixels of display 14 and/or light source 104L may emit low power visible light (e.g., pulsed visible light at intensities that are not disruptive to a user's viewing of display images). Light detector 104D may be configured to measure light that has been emitted by light source 104L after that light has passed upwards through opening 106 and has reflected off of lower diffuser surface 34L and returned back through opening 106 to detector 104D.

The distance of opening 106 from diffuser 34 varies as height H varies (e.g., as diffuser 34 moves relative to substrate 60, where sensor 104 is mounted using solder or other conductive materials). As the separation between opening 106 and surface 34L varies, the amount of light from light source 104L that is able to reflect from surface 34L and return to detector 104D varies by a corresponding amount. If, for example, surface 34L is close to opening 106, a relatively large amount of light from source 104L will reflect from surface 34L and return to detector 104D. If surface 34L is far from opening 106, the amount of reflected light from surface 34L that is detected by detector 104D will decrease. As a result, sensors such as sensor 104 of FIG. 11 serve as proximity (distance) sensors that can dynamically measure the height H of diffuser 34 at various sensor locations across backlight 42.

Figure 12:
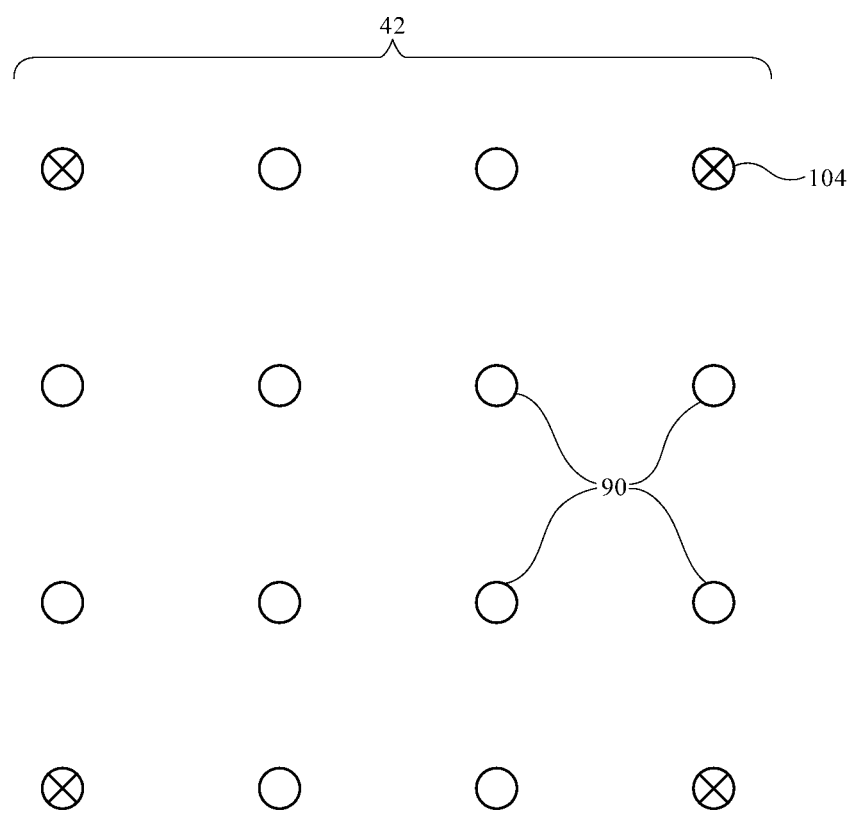
FIG. 12 is a top view of an illustrative array of support posts and diffuser layer height sensors for a backlight in accordance with an embodiment.

Sensors 104 may, if desired, be interspersed with support posts 90 (e.g., sensors 104 and posts 90 may be interspersed with each other in an array in which sensors and posts are located at the corners of cells 38C). An illustrative pattern of the type that may be used in distributing support posts 90 and sensors 104 across backlight 42 is shown in FIG. 12. In this arrangement, there are more support posts 90 than sensors 104. There may, in general, be any suitable number of support posts 90 and any suitable number of sensors 104 (e.g., one sensor for every 1-5 support posts, etc.). The arrangement of FIG. 12 is illustrative.

Figure 13:
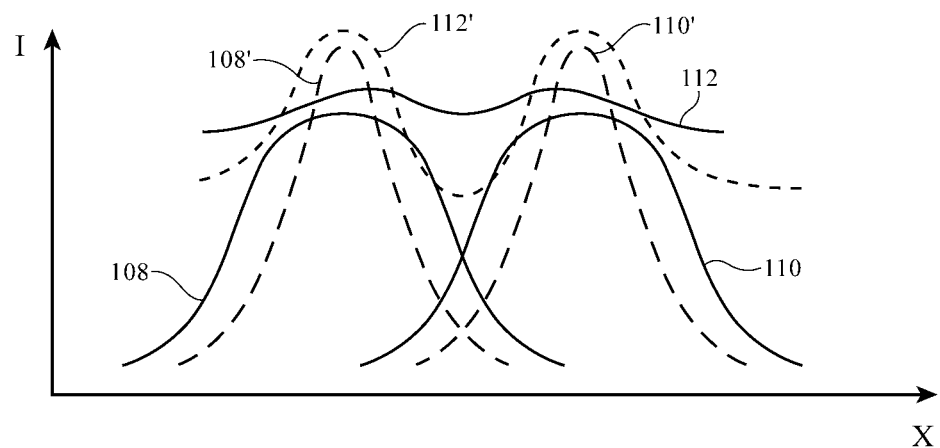
FIG. 13 is a graph showing how backlight intensity may vary as a function of lateral position and how backlight intensity may vary when a portion of a backlight is compressed in accordance with an embodiment.
Figure 14:
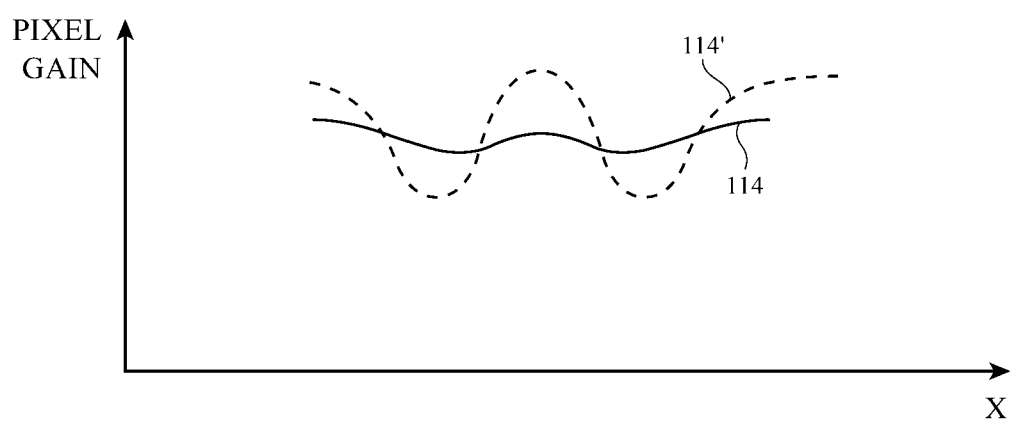
FIG. 14 is a graph of illustrative pixel gain profiles that may be applied to image data for a pixel array in a display to compensate for backlight intensity variations across the display in accordance with an embodiment.

The graphs of FIGS. 13 and 14 illustrate how sensor measurements may be used to dynamically compensate display 14 to reduce or eliminate image intensity variations due to variations in H across display 14. In the graph of FIG. 13, backlight output intensity I (e.g., the intensity of illumination 44) has been plotted as a function of lateral distance X across backlight 42. The region of backlight 42 that is covered in the graph of FIG. 13 covers two cells 38C and two corresponding light sources 38. Due to the presence of light sources 38 at the center of cells 38C, there may be localized peaks in light output at the center of each cell, as indicated by solid lines 108 and 110 (the output of each cell 38C) and solid line 112 (the resulting combined output of both cells 38C). To eliminate the intensity variations associated with line 112 in the final images displayed for a user of device 10, display driver circuitry in device 10 may be provided with a compensating pixel gain profile such as pixel gain profile 114 of FIG. 14. By locally reducing pixel gain at locations where backlight intensity has a local peak and vice versa, the final images displayed on display 14 for the user will not exhibit significant intensity fluctuations due to backlight intensity variations.

In the event that distance H decreases (as an example) in the vicinity of the cells of FIGS. 13 and 14, the light output profiles from each of the cells will become narrower and more pronounced, as indicated by curves 108' and 110'. This is because a decrease in H will place diffuser 34 closer to light sources 38. The resulting intensity profile for backlight 42 will therefore change from curve 112 to curve 112'. By measuring the decrease in H with one or more sensors 104, the pixel gain curve can be updated accordingly. For example, display driver circuitry for display 14 may be provided with pixel gain curve look-up table entries that correspond to curve 114' of FIG. 14 rather than curve 114. By updating the pixel gain profile dynamically based on sensor data from sensors 104, changes in the transmission of pixels 16 can compensate for changes in backlight illumination intensity, thereby ensuring the images on display 14 are free from hotspots and dark areas.

Figure 15:
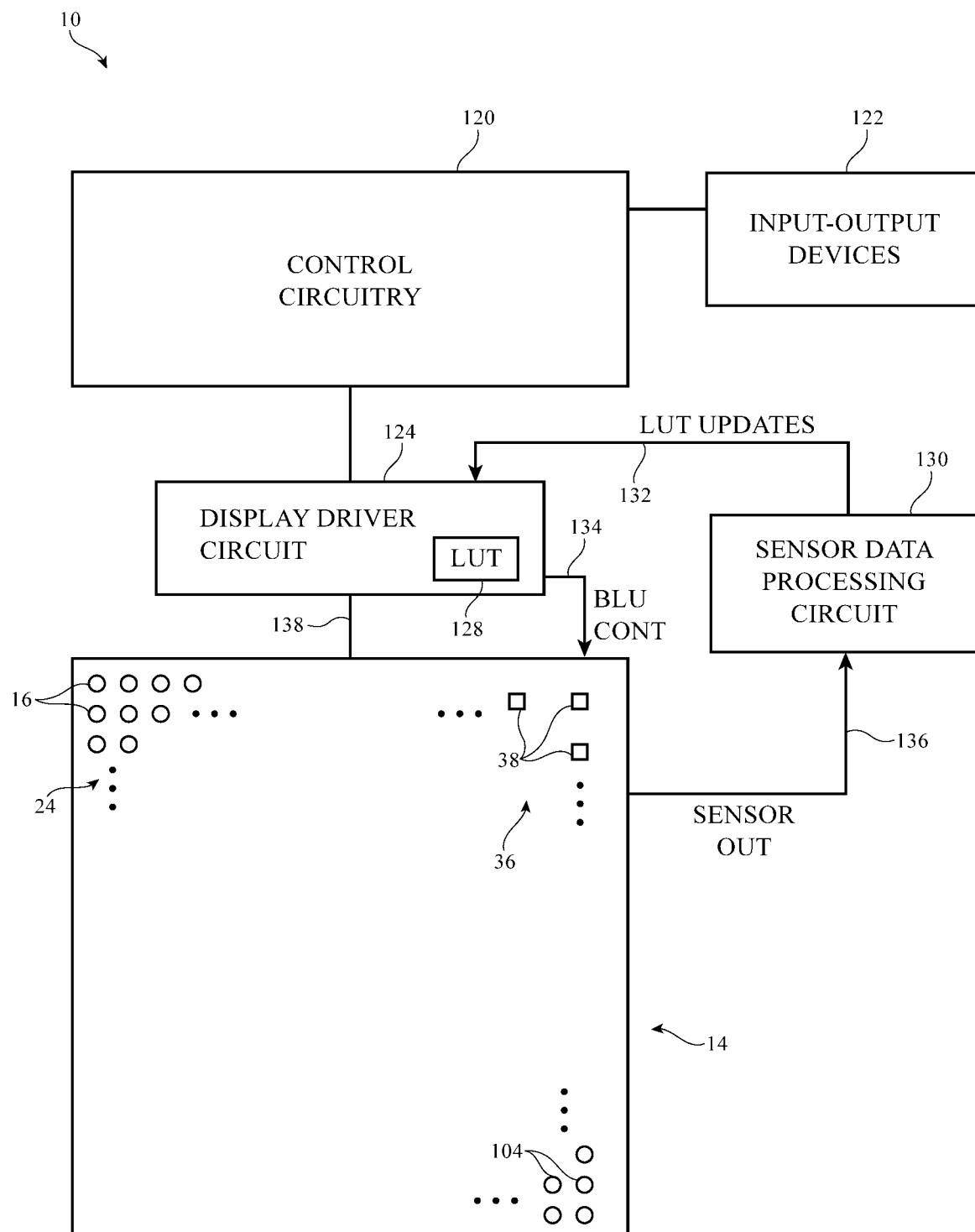
FIG. 15 is a circuit diagram showing illustrative circuitry for an electronic device having a display with optical diffuser position sensors in accordance with an embodiment.

FIG. 15 is a circuit diagram of device 10. As shown in FIG. 15, device 10 may have control circuitry 120. Control circuitry 120 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 120 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 122 may be used to allow data to be supplied to device 10 and to allow data to be provided from device 10 to external devices. Input-output devices 122 may include buttons, joysticks, scrolling wheels, touch pads, key pads, keyboards, microphones, speakers, tone generators, vibrators, cameras, sensors (e.g., ambient light sensors, proximity sensors, orientation sensors, magnetic sensors, force sensors, touch sensors, pressure sensors, fingerprint sensors, etc.), light-emitting diodes and other status indicators, data ports, etc. A user can control the operation of device 10 by supplying commands through input-output devices 122 and may receive status information and other output from device 10 using the output resources of input-output devices 122.

Device 10 may include one or more displays such as display 14. Display 14 may include an array of pixels 16 such pixel array 24 that displays images in response to control and data signals from display driver circuitry 124. Control circuitry 16 may be used to run software on device 10 such as operating system code and applications. During operation of device 10, the software running on control circuitry 16 may display images on pixel array 24 by using display driver circuitry 124 to supply pixel array 24 with image data and control signals over path 138. Display driver circuitry 124 may also issue backlight control commands to light sources 38 in array 36, which is overlapped by pixel array 16, thereby allowing display driver circuitry 124 to adjust both pixel transmission (e.g., by adjusting liquid crystal pixel transmission values) and backlight output (by adjusting the brightness of sources 38). The pixel data that is supplied to pixels 16 may be corrected by circuitry 124 for backlight intensity variations by applying a pixel gain profile stored in look-up table 128.

Sensor data from an array of sensors 104 that is interspersed among cells 38C of array 36 may be received by control circuitry such as sensor data processing circuitry 130. Circuitry 130 may determine heights H in real time based on measurements from sensors 104 that are received via path 136. In response, circuitry 130 may supply pixel gain profile updates to pixel gain profile look-up table 128 in display driver circuitry 124, as described in connection with the illustrative pixel gain profiles of FIG. 14. If, for example, sensor data from sensors 104 indicates that the value of H is decreasing in a particular cell 38C, the pixel gain curve for that cell may be updated from an old pixel gain curve such as curve 114 of FIG. 14 to a new pixel gain curve of the type appropriate for a decreased H value such as pixel gain profile 114' of FIG. 14. The gain profile that is updated in look-up table 128 may be a two-dimensional profile that covers pixel gain values in both the X and Y lateral dimension of pixel array 24.

In accordance with an embodiment, a display is provided that includes an array of pixels configured to display images and a backlight configured to produce backlight illumination for the array of pixels, the backlight has a two-dimensional array of cells that each include a light source and a reflector, a printed circuit on which the light sources are mounted, a diffuser, and support posts interspersed that are configured to support the diffuser, the support posts include white polymer portions.

In accordance with another embodiment, the support posts include clear polymer portions.

In accordance with another embodiment, each of the clear polymer portions covers at least part of a respective one of the white polymer portions.

In accordance with another embodiment, the clear polymer portions are tapered.

In accordance with another embodiment, the white polymer portions have rounded tips each of which is covered by a respective one of the clear polymer portions.

In accordance with another embodiment, the white polymer portions are cylindrical.

In accordance with another embodiment, the display includes screws that each attach a respective one of the support posts to the printed circuit.

In accordance with another embodiment, the display includes elastomeric gaskets, a respective one of the elastomeric gaskets is interposed between at least part of each screw and the printed circuit.

In accordance with another embodiment, the support posts are formed from protrusions in the diffuser.

In accordance with another embodiment, at least some of the support posts are conical.

In accordance with another embodiment, the conical support posts have diameters that are smaller at the diffuser than at the printed circuit.

In accordance with another embodiment, the display includes an array of optical sensors on the printed circuit that measure respective separation distances between the diffuser and the printed circuit.

In accordance with another embodiment, the support posts are interspersed with the optical sensors on the printed circuit.

In accordance with another embodiment, the display includes display driver circuitry with a look-up table configured to maintain a pixel gain profile that compensates the images for backlight intensity variations across the array of pixels.

In accordance with another embodiment, the display includes control circuitry that is configured to update the pixel gain profile in the look-up table in response to measurements of the separation distances from the array of optical sensors.

In accordance with another embodiment, the optical sensors each include a light-emitting diode and a light detector configured to detect light from the light-emitting diode that has reflected from the diffuser.

In accordance with an embodiment, a display is provided that includes an array of pixels configured to display images and a backlight configured to produce backlight illumination for the array of pixels, the backlight has a two-dimensional array of cells that each include a light source and a reflector, a printed circuit on which the light sources are mounted, a diffuser, and an array of support posts that are attached to the diffuser with adhesive and that are configured to separate the diffuser from the printed circuit.

In accordance with another embodiment, the support posts include clear polymer portions adjacent to the diffuser.

In accordance with another embodiment, the display includes optical sensors on the printed circuit that are configured to measure respective separation distances between the diffuser and the printed circuit.

In accordance with an embodiment, a display is provided that includes an array of pixels configured to display images, and a backlight configured to produce backlight illumination for the array of pixels, the backlight has a two-dimensional array of cells that each include a light source and a reflector, a printed circuit on which the light sources are mounted, and a diffuser and the backlight includes support posts that are configured to separate the diffuser from the printed circuit by a distance and optical sensors that measure respective distances between the printed circuit and the diffuser.

The foregoing is merely illustrative and various modifications can be made to the described embodiments. The foregoing embodiments may be implemented individually or in any combination.

What is claimed is:

1. A display, comprising:
   an array of pixels configured to display images; and
   a backlight configured to produce backlight illumination for the array of pixels, wherein the backlight has a two-dimensional array of cells that each includes a light source and a reflector, a printed circuit on which the light sources are mounted, a diffuser, and support posts that are configured to support the diffuser, wherein the support posts comprise posts formed from protrusions in the diffuser that have an upper portion with a curved flared profile and a lower cylindrical portion.

2. The display defined in claim 1 wherein the support posts include clear polymer portions.

3. The display defined in claim 2 wherein the backlight further comprises screws that each attach a respective one of the support posts to the printed circuit.

4. The display defined in claim 3 further comprising elastomeric gaskets, wherein a respective one of the elastomeric gaskets is interposed between at least part of each screw and the printed circuit.

5. The display defined in claim 4 further comprising a chassis on which the backlight is mounted, wherein the chassis has openings through which a head of each screw passes.

6. The display defined in claim 5 wherein the chassis is a metal chassis.

7. The display defined in claim 5 wherein each screw passes through one of the openings in the chassis, an opening in the printed circuit, and is coupled to a respective one of the support posts.

8. The display defined in claim 1 further comprising:
an array of optical sensors on the printed circuit, wherein the optical sensors measure respective separation distances between the diffuser and the printed circuit.

9. The display defined in claim 8 wherein the support posts are interspersed with the optical sensors on the printed circuit.

10. The display defined in claim 9 further comprising display driver circuitry with a look-up table configured to maintain a pixel gain profile that compensates the images for backlight intensity variations across the array of pixels.

11. The display defined in claim 10 further comprising control circuitry that is configured to update the pixel gain profile in the look-up table in response to measurements of the separation distances from the array of optical sensors.

12. The display defined in claim 8 wherein the optical sensors each include a light-emitting diode and a light detector configured to detect light from the light-emitting diode that has reflected from the diffuser.

13. A display comprising:
an array of pixels configured to display images; and
a backlight configured to produce backlight illumination for the array of pixels, wherein the backlight comprises:
an array of cells, each of which includes a light source and a reflector,
a printed circuit on which the light sources are mounted,
a diffuser overlapping the light sources and reflectors, wherein the diffuser has a planar portion and integral protrusions that extend from the planar portion to the printed circuit to support the diffuser, and
a chassis that supports the printed circuit, wherein the integral protrusions of the diffuser are attached the chassis with screws.

14. The display defined in claim 13 wherein the chassis is a metal chassis.

15. A display comprising:
an array of pixels configured to display images; and
a backlight configured to produce backlight illumination for the pixels, wherein the backlight comprises:
a two-dimensional array of cells that each includes a light source and a reflector,
a printed circuit on which the light sources are mounted, and
a diffuser having a planar portion that overlaps the light sources and integral protrusions that extend from the planar portion, wherein the integral protrusions extend from the diffuser to the printed circuit to support the diffuser, and wherein each integral protrusions has an upper portion with a curved flared profile and a lower cylindrical portion.

* * * * *